Figure 2:
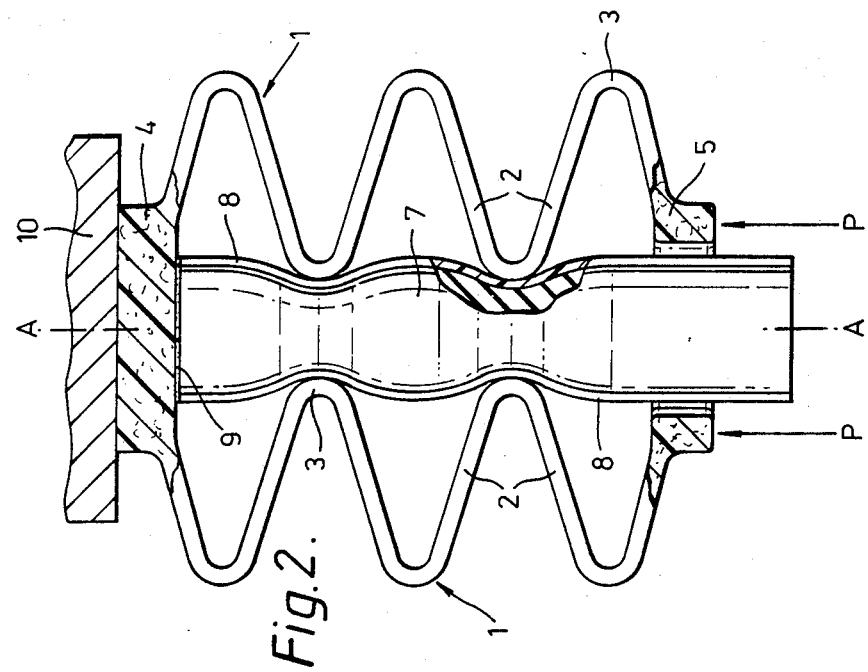

United States Patent [19]

Scowen

[11] Patent Number: 4,905,972

[45] Date of Patent: Mar. 6, 1990

[54] DAMPED SPRING

[75] Inventor: Geoffrey D. Scowen, Shropshire, England

[73] Assignee: The Secretary of State for Trade and Industry in Her Britannic Majesty's Government of the United Kingdom of Great Britain and Northern Ireland, London, England

[21] Appl. No.: 302,107

[22] Filed: Jan. 25, 1989

Related U.S. Application Data

[63] Continuation of Ser. No. 912,605, filed as PCT GB86/00011 on Jan. 9, 1986, published as WO86/04124 on Jul. 17, 1986, abandoned.

[30] Foreign Application Priority Data

Jan. 10, 1985 [GB] United Kingdom ............... 8500605

[51] Int. Cl.$^4$ ............................................. F16F 3/10
[52] U.S. Cl. ..................................... 267/152; 267/165
[58] Field of Search ............ 188/129; 267/141, 140.3, 267/140.4, 141, 151, 152, 164, 165, 182, 259

[56] References Cited

U.S. PATENT DOCUMENTS 2,913,240 11/1959 Mohr ................................. 207/149

FOREIGN PATENT DOCUMENTS 1077540 3/1960 Fed. Rep. of Germany .
0898053 4/1944 France ............................. 267/140.3

OTHER PUBLICATIONS

"Composite Truck Springs Set For Volume Production," May 1984, Automotive Engineering, vol. 92, No. 5, pp. 88-90.

Primary Examiner—Duane A. Reger
Attorney, Agent, or Firm—Nixon & Vanderhye

[57] ABSTRACT

A combined spring and damper comprises a plurality of spring elements (1), each of zig-zag form, disposed in radial planes with respect to a common axis. Also situated on the axis is a mass (7) of resilient material. When the spring is compressed along the axis the inward contraction of inner reflex portions (3) of the spring elements is resisted by the mass of resilient material, and the resulting axial movement of the radially inner reflex portions is resisted by contact with the mass of resilient material and axial compression thereof.

17 Claims, 1 Drawing Sheet

U.S. Patent

Mar. 6, 1990

4,905,972

DAMPED SPRING

This is a continuation of Ser. No. 912,605 filed as PCT GB86/00011 on Jan. 9, 1986, published as WO86/04124 on Jul. 17, 1986, now abandoned.

The invention relates to a combined spring and damper such as would be used, for example, in a vehicle suspension. Conventional practice is to provide spring and damper as distinct independant units. The present invention employs a spring of unconventional form, which leads to the possibility of employing the spring itself in a dual function in that the spring element also forms a part of the damper. It is anticipated that this will lead to the possibility of saving of materials, cost and weight for the combined unit. All of these are particularly desirable objectives, especially in the automotive field.

Accordingly the present invention provides a combined spring and damper comprising a plurality of spring elements and a mass of resilient material, each spring element being in the form of a continuous strip of resilient material which is disposed when unstressed in the form of a zig-zag consisting of a plurality of limbs and link portions of reflex form which join together adjacent pairs of limbs by one end thereof, the spring elements each extending in the same general direction, and being disposed in radial planes with respect to a common axis, the mass of resilient material being located on the said axis, whereby on compression of the spring elements in the direction of the said axis, the resulting radially inward movement of the radially inner reflex portions is resisted resiliently by the mass of resilient material, and the resulting axial movement of the radially inner reflex portions is resisted by contact with the mass of resilient material and axial compression thereof.

The spring elements may very conveniently be of fibre reinforced plastics material.

Spring elements of this kind are disclosed and claimed in my co-pending International Patent Application No. GB/84/00207.

Alternatively the spring elements may be of metal.

The mass of resilient material will generally have a much greater elasticity than the material of the spring elements.

The mass of resilient material is suitably of an elastemeric substance, such as natural or synthetic rubber.

The surface of the mass of resilient material may be provided with a layer of wear resistant material, at least in the regions which can be contacted by the spring elements.

This coating may be for example of metal, a hard plastics material, or a low friction material such as polytetrafluoroethylene.

The coating may define concavities in which the inner reflex portions are receivable, whereby sliding movement between the spring elements and the resilient mass is minimised. Damping is then achieved primarily as a result of deformation of the resilient material and consequent internal energy dissipation, ie hysteresis losses.

Figure 1:
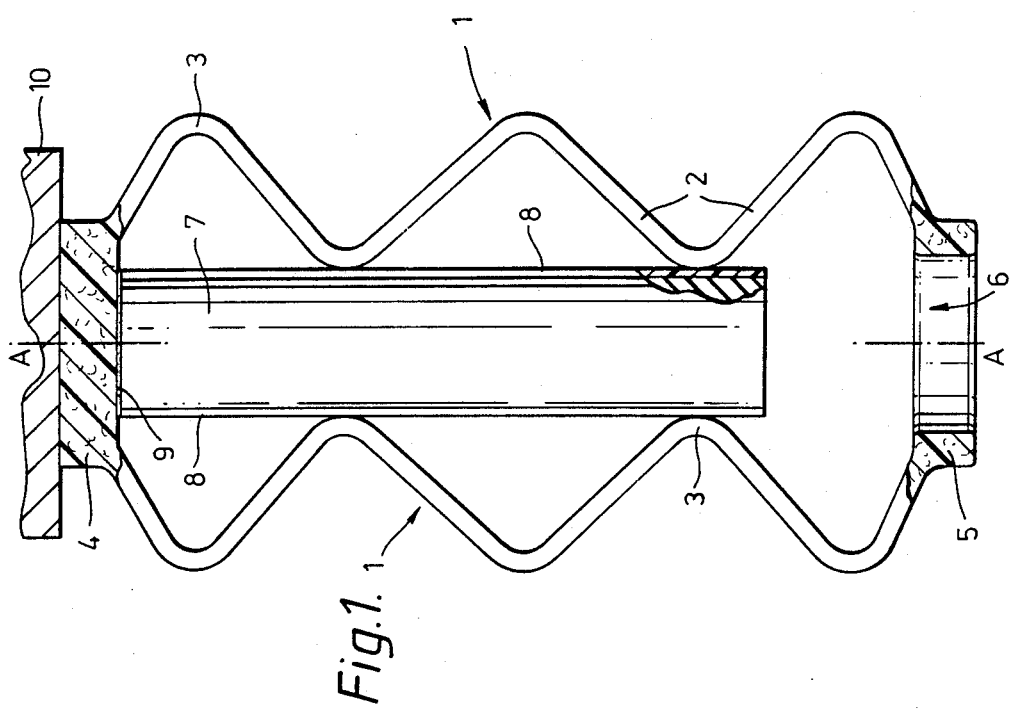

The invention will now be described by way of example only with reference to the accompanying drawings, of which FIG. 1 shows a combined spring and damper in accordance with the invention, when in an unstressed state, and FIG. 2 shows the combined spring and damper of FIG. 1 when in a compressed state.

As shown in the Figures, the combined spring and damper comprises a pair of spring elements 1, each spring element being in the form of a continuous strip of fibre-reinforced plastics material disposed in the form of a zig-zag. Each element consists of six links 2, and five link portions 3 which join together each adjacent pair of links by one end.

The spring elements 1 are disposed in radial planes with respect to a common axis AA. Although only two spring elements 1 are illustrated, in practice it may be preferred to provide three or four or more spring elements 1, similarly disposed in radial planes with respect to the axis AA, and normally arranged symmetrically.

The spring elements 1 are integrally joined at their upper ends by an end-piece 4, and at their lower ends by an end-piece 5 provided with a central aperture 6.

Enclosed within the spring elements 1 and lying on the axis AA, there is provided a core comprising a mass 7 of a resilient elastomeric material, for example a polyurethane or synthetic rubber. The radially inner ones of the reflex portions 3 bear upon the core, which is provided with longitudinal rubbing strips of a wear resistent flexible plastics material 8 which extend along the longitudinal lines of contact. The core is fixed, e.g., by adhesive to the end-piece 4.

In use, for example as a suspension unit for an automobile, the unit is attached to the body of the vehicle or other device, which is indicated at 10. The sprung mass (e.g. vehicle wheels, axles, brakes etc) to be suspended from the body 10 is connected to the lower end-piece 5 so as directly to load the spring elements 1, but not directly to load the mass 7 of elastomeric material, as indicated by the arrows P (FIG. 2).

When a load is applied as indicated at P, the action of the device is as follows. The spring elements 1 are compressed, and they therefore deform in such a way that the inner ones of the reflex portions 3 move inwardly due to the bending movement and upwardly from their position as shown in FIG. 1 to the positions shown in FIG. 2. As shown therein, the lower end of the elastomer mass 7 can freely enter the aperture 6. As this movement occurs, the resilient mass 7 is thereby compressed radially inwards. At the same time, by virtue of the frictional engagement between the inner reflex portions 3 and the rubbing strips 8, there is a degree of frictional sliding contact between these components, and at the same time some longitudinal compression of the resilient mass occurs.

A damping effect is therefore obtained from three factors, i.e., the radial and longitudinal deformation of the elastomeric mass 7, which results in energy dissipation on account of internal hysteresis losses (internal friction in the material), and also from the aforesaid frictional sliding contact.

By appropriate choice of materials, the effect of the sliding friction can be varied—e.g., if polytetrafluoroethylene is used as the rubbing strip material, the sliding friction will be low, and the possibility of "stick-slip" will be reduced.

As an alternative to the use of strips 8, ring (not illustrated) presenting a concave outer surface could be provided at each axial location of the inner reflex portions 3, so that each reflex portion is positively located by a ring. The rings can be fixed, e.g., by insert moulding or by adhesive, the elastomer mass 7. Frictional sliding contact would thus be minimised, so reducing wear, but the axial compressive effect on the elastomer mass would be increased. A similar effect could be obtained by use of individual concave contact pieces fixed to the elastomer mass 7, one corresponding to each inner reflex portion 3.

It should be especially noted that the invention provides a suspension member having the inherent property that its stiffness increases as the compressive deformation increases.

I claim:

1. A combined compression spring and damper comprising a plurality of compression spring elements and a mass resilient material, each spring element being in the form of a continuous strip of resilient material which is disposed when unstressed in the form of a zig-zag consisting of a plurality of limbs and link portions of reflex form which join together adjacent pairs of limbs by one end thereof, the spring elements each extending in the same general direction, and being disposed in radial planes with respect to a common axis such that the zig-zag configuration alternates toward and away from said axis, the mass of resilient material being located on the said axis with its external surface disposed at least closely adjacent the radially inner link portions but otherwise spaced inwardly from said spring elements, whereby on compression of the spring elements in a direction generally parallel to said axis, the resulting radially inward movement of the radially inner reflex portions is resisted resiliently by the mass of resilient material, and the resulting axial movement of the radially inner reflex portions is resisted by contact with the mass of resilient material and axial compression thereof.

2. A combined spring and damper according to claim 1 wherein the spring elements are of fibre reinforced plastics material.

3. A combined spring and damper according to claim 1 wherein the mass of resilient material is of an elastomeric material.

4. A combined spring and damper according to claim 3 wherein the elastomeric material is natural or synthetic rubber.

5. A combined spring and damper according to claim 1 where in the surface of the mass of resilient material is provided with a layer of wear resistant material at least in the region which can be contacted by the spring elements.

6. A combined spring and damper according to claim 5 wherein the wear resistant material is a metal, a hand plastics material, or a low friction material.

7. A combined spring and damper according to claim 6 wherein the wear resistant material is polytetrafluoroethylene.

8. A combined spring and damper according to claim 5 wherein the layer of wear resistant material defines concavities in which the inner reflex portions are receivable, whereby sliding movement between the spring elements and the resilient mass is minimised, and damping is achieved primarily as a result of deformation of the resilient material and consequent internal energy dissipation.

9. A combined spring and damper according to claim 2 wherein the mass of resilient material is of an elastomeric material.

10. A combined spring and damper according to claim 9 wherein the elastomeric material is natural or synthetic rubber.

11. A combined spring and damper according to claim 10 wherein the surface of the mass of resilient material is provided with a layer of wear resistant material at least in the region which can be contacted by the spring elements.

12. A combined spring and damper according to claim 3 wherein the surface of the mass of resilient material is provided with a layer of wear resistant material at least in the region which can be contacted by the spring elements.

13. A combined spring and damper according to claim 12 wherein the wear resistant material is a metal, a hard plastics material, or a low friction material.

14. A combined spring and damper according to claim 6 wherein the wear resistant material is polytetrafluoroethylene.

15. A combined spring and damper according to claim 14 wherein the layer of wear resistant material defines concavities in which the inner reflex portions are receivable, whereby sliding movement between the spring elements and the resilient mass is minimised, and damping is achieved primarily as a result of deformation of the resilient material and consequent internal energy dissipation.

16. A combined compression spring and damper as claimed in claim 1 further comprising end pieces disposed at the axial ends of said spring elements and interconnecting adjacent ends of the spring elements, said mass of resilient material being connected to only one of said end pieces.

17. A combined compression spring and damper as claimed in claim 1 wherein in the unstressed state of said spring elements the radially inner ones of said link portions of said reflex form bear against said mass of resilient material, the radially outer link portions of reflex form being spaced outwardly from said mass of resilient material.

* * * * *